June 20, 1933.                E. R. BUTTS                1,914,734
                               EAR HORN
                          Filed April 6, 1932
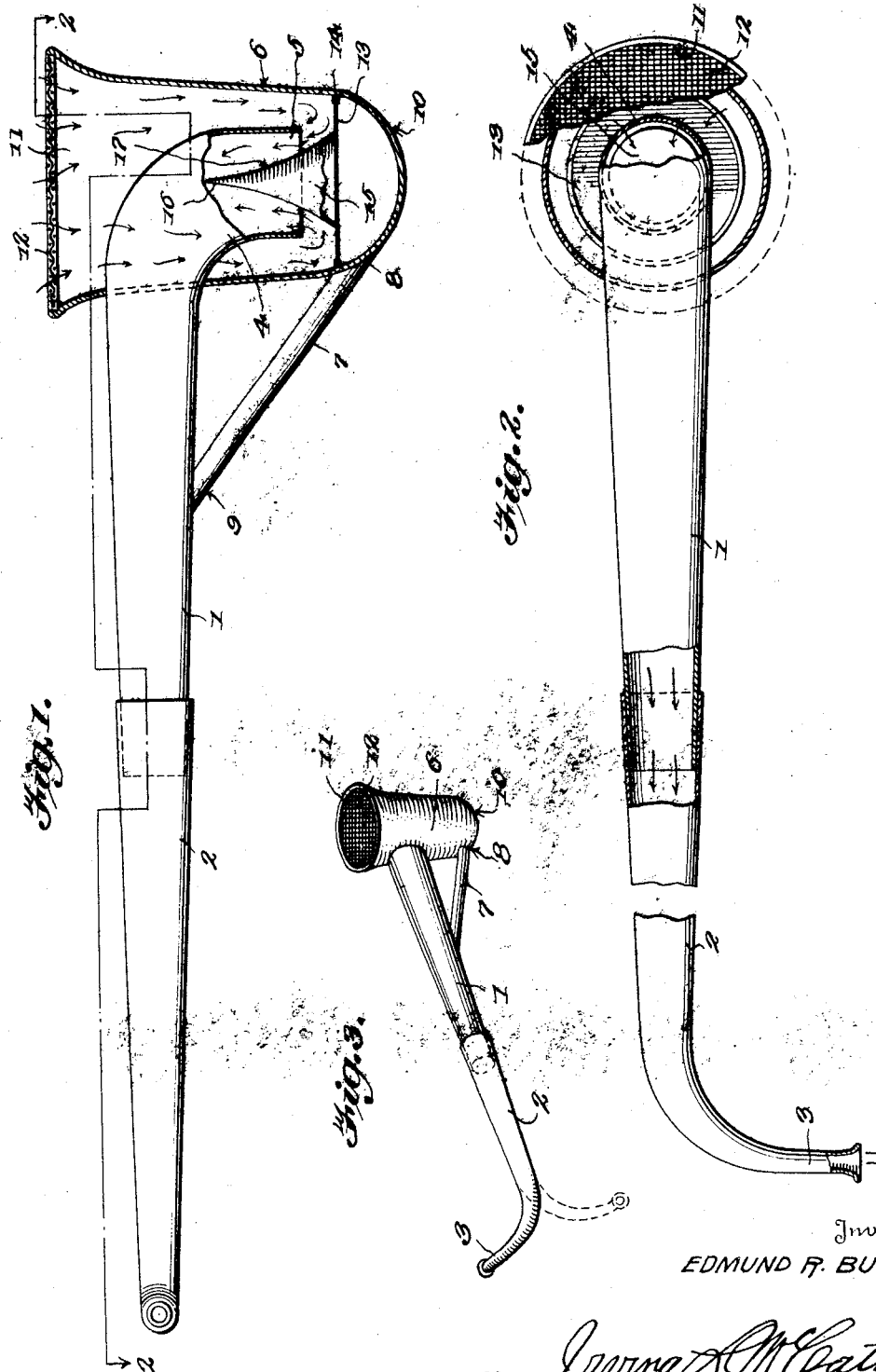
Inventor
EDMUND R. BUTTS Patented June 20, 1933

1,914,734

UNITED STATES PATENT OFFICE

EDMUND R. BUTTS, OF ESMOND, NORTH DAKOTA

EAR HORN

Application filed April 6, 1932. Serial No. 603,628.

This invention relates to ear horns or trumpets, and has for its object the production of a simple and efficient means for facilitating the increase of sound or the magnifying of sound to the extent that a person who is partially deaf or hard-of-hearing may be enabled to hear an ordinary conversation.

Another object of this invention is the production of a simple and efficient ear horn or trumpet which is so constructed as to provide a diaphragm within the horn and is also provided with means for deflecting the sound up through the tube which is adapted to be inserted into the ear.

A further object of this invention is the production of an ear horn which consists of a minimum number of parts and which may be cheaply manufactured.

In the drawing:—

Figure 1 is a side elevation of the ear horn, a portion thereof being shown in section;

Figure 2 is a section taken on line 2—2 of Figure 1; and

Figure 3 is a perspective view of the improved ear horn.

By referring to the drawing it will be seen that 1 designates the main tube of the ear horn which preferably tapers toward its outer end and receives the removable and adjustable shank 2 having an ear-piece 3 extending laterally thereof. The shank 2 is mounted upon the main portion 1 of the tube in such a manner as to permit the shank 2 to be adjusted or swung to permit the ear-piece to be conveniently fitted into the right or left ear.

The main tube 1 of the horn is provided with a downwardly curved sound-catching net 4 having an open end 5, the main tube 1 being larger at its inner end and tapering toward the outer end which engages or fits into the inner end of the adjustable shank 2. This tube 1 carries a sound-catching cup 6, and this cup 6 is braced by means of a bracing member 7, the bracing member being secured near the bottom of the cup, as indicated at 8, and also being secured to the underface of the tube 1, as indicated at 9. The brace 7 will not only brace the cup 6 but will also constitute an efficient handle.

The cup 6 preferably is of an elongated body having its curved bottom 10 and an open outwardly flared upper end 11. A suitable screen 12 is placed over this open outer end 11 as shown clearly in the drawing. A diaphragm 13 is secured in any suitable or desired manner at 14, to the inner walls of the sound-catching cup 6 near the bottom thereof, and this diaphragm 13 carries an elongated inverted deflector comb 15, the base of the cone being secured to the diaphragm, as shown, and the apex 16 of the comb extending upwardly into the open end 5 of the downwardly curved or bent portion 4 of the tube 1, as clearly shown in Figure 1.

As the sound enters the opening 11 of the cup 6, the sound will travel downwardly as indicated by the direction of the arrows, and will strike the diaphragm thereby being greatly increased, and will be deflected upwardly against the side walls 17 of the cone 15, and the sound will then pass in its magnified tone up through the open end 5 of the downwardly curved end 4 of the tube 1, and out through the tube 1 into the shank 2, and from there into the ear of the user. The base 10 of the cup-shaped sound-catching cup 6 is to be made of rigid and strong material to protect the diaphragm 13 against injury. It should be understood that the diaphragm 13 is sufficiently spaced from the lower end of the tube 1 to properly operate and the cone 15 is mounted freely within the end 5 of the tube 1 out of contact with the walls of the tube in order that the diaphragm may have a free vibration to catch the sound passing into the cup-shaped sound-catching member 6 and magnify the sound passing the same up through the tube 1.

It should be understood that certain detail changes in the mechanical construction may be employed without departing from the spirit of the invention so long as these changes fall within the scope of the appended claims.

Having described the invention, what is claimed as new is:—

1. An ear horn of the class described comprising a sound-carrying tube, a sound-catching cup, said tube communicating with the cup, and a diaphragm carried by one end of the cup and arranged in spaced relation with respect to the sound-carrying tube.

2. An ear horn of the class described comprising a sound-carrying tube, a sound-catching cup, said tube communicating with the cup, a diaphragm carried by one end of the cup and arranged in spaced relation with respect to the sound-carrying tube, and a cone carried by the diaphragm and extending into the open end of said sound-carrying tube.

3. An ear horn of the class described comprising a sound-carrying tube, a sound-catching cup, said tube communicating with the cup, a diaphragm carried by one end of the cup and arranged in spaced relation with respect to the sound-carrying device, and an elongated tapering cone carried by the diaphragm and projecting up into the open end of said sound-carrying tube.

In testimony whereof I affix my signature.

EDMUND R. BUTTS.